United States Patent
Berkey et al.

(10) Patent No.: US 8,953,917 B2
(45) Date of Patent: Feb. 10, 2015

(54) LOW BEND LOSS OPTICAL FIBER

(71) Applicants: George Edward Berkey, Pine City, NY (US); Dana Craig Bookbinder, Corning, NY (US); Steven Bruce Dawes, Corning, NY (US); Ming-Jun Li, Horseheads, NY (US); Pushkar Tandon, Painted Post, NY (US); Ji Wang, Painted Post, NY (US)

(72) Inventors: George Edward Berkey, Pine City, NY (US); Dana Craig Bookbinder, Corning, NY (US); Steven Bruce Dawes, Corning, NY (US); Ming-Jun Li, Horseheads, NY (US); Pushkar Tandon, Painted Post, NY (US); Ji Wang, Painted Post, NY (US)

(73) Assignee: Corning Incorporated, Corning, NY (US)

(*) Notice: Subject to any disclaimer, the term of this patent is extended or adjusted under 35 U.S.C. 154(b) by 170 days.

(21) Appl. No.: 13/680,641

(22) Filed: Nov. 19, 2012

(65) Prior Publication Data
US 2013/0136407 A1 May 30, 2013

Related U.S. Application Data

(60) Provisional application No. 61/564,902, filed on Nov. 30, 2011.

(51) Int. Cl.
*G02B 6/036* (2006.01)
*G02B 6/028* (2006.01)

(52) U.S. Cl.
CPC .............. *G02B 6/028* (2013.01); *G02B 6/0365* (2013.01); *G02B 6/0286* (2013.01); *G02B 6/03627* (2013.01); *G02B 6/03638* (2013.01)
USPC ........................................................ 385/127

(58) Field of Classification Search
CPC ..................... G02B 6/0365; G02B 6/03638
USPC .................... 385/124, 126, 127, 142, 144
See application file for complete search history.

(56) References Cited

U.S. PATENT DOCUMENTS

| | | | |
|---|---|---|---|
| 5,559,921 A | 9/1996 | Terasawa et al. | |
| 5,781,684 A * | 7/1998 | Liu | 385/124 |
| 6,282,354 B1 * | 8/2001 | Jones et al. | 385/124 |
| 7,187,833 B2 | 3/2007 | Mishra | |
| 7,450,807 B2 | 11/2008 | Bickham et al. | |
| 7,620,282 B2 | 11/2009 | Bickham et al. | |
| 7,676,129 B1 | 3/2010 | Bookbinder et al. | |
| 7,689,085 B1 | 3/2010 | Mishra | |
| 7,787,731 B2 * | 8/2010 | Bookbinder et al. | 385/124 |

(Continued)

FOREIGN PATENT DOCUMENTS

WO 2012059399 5/2012

*Primary Examiner* — Daniel Petkovsek
(74) *Attorney, Agent, or Firm* — Svetlana Short

(57) ABSTRACT

According to some embodiments a single mode fiber includes:
  a germania doped central core region having outer radius $r_1$ and relative refractive index $\Delta_1$; and
  a cladding region comprising (i) a first inner cladding region having an outer radius $r_2 > 6$ microns and relative refractive index $\Delta_2$ and $0.3 \leq r_1/r_2 \leq 0.85$; and (ii) a second inner cladding region having an outer radius $r_3 > 9$ microns and comprising a minimum relative refractive index $\Delta_3$, wherein said second inner cladding region has at least one region with a relative refractive index delta that becomes more negative with increasing radius; and (iii) an outer cladding region surrounding the second inner cladding region and comprising relative refractive index $\Delta_4$, wherein $\Delta_1 > \Delta_2 > \Delta_3$, $\Delta_3 < \Delta_4$.

21 Claims, 10 Drawing Sheets

(56) References Cited

U.S. PATENT DOCUMENTS

| | | |
|---|---|---|
| 7,899,293 B2 | 3/2011 | de Montmorillon et al. |
| 7,903,917 B2 | 3/2011 | Bickham et al. |
| 7,929,818 B1 | 4/2011 | Bickham et al. |
| 7,995,889 B2 | 8/2011 | de Montmorillon et al. |
| 8,200,057 B2 * | 6/2012 | Han et al. ............... 385/127 |
| 8,588,569 B2 * | 11/2013 | Bookbinder et al. ......... 385/124 |
| 8,666,214 B2 * | 3/2014 | Bookbinder et al. ......... 385/124 |
| 2010/0195966 A1 | 8/2010 | Bickham et al. |
| 2011/0058780 A1 | 3/2011 | Han et al. |

* cited by examiner

LOW BEND LOSS OPTICAL FIBER

CROSS-REFERENCE TO RELATED APPLICATIONS

This application claims the benefit of priority under 35 U.S.C. §119 of U.S. Provisional Application Ser. No. 61/564,902 filed on Nov. 30, 2011 the content of which is relied upon and incorporated herein by reference in its entirety.

FIELD

The present invention relates to optical fibers having low bend losses.

TECHNICAL BACKGROUND

There is a need for low bend loss optical fibers, particularly for optical fibers utilized in so-called "access" and fiber to the premises (FTTx) optical networks. Optical fiber can be deployed in such networks in a manner which induces bend losses in optical signals transmitted through the optical fiber. Some fiber applications that can impose physical demands such as tight bend radii, or compression of optical fiber, etc., that induce fiber bend losses. The requirements that impose these demands include, for example, the deployment of optical fiber in optical drop cable assemblies, distribution cables with Factory Installed Termination Systems (FITS) and slack loops, small bend radius multiports located in cabinets that connect feeder and distribution cables, and jumpers in Network Access Points between distribution and drop cables. It has been difficult in some single mode optical fiber designs to achieve both low bend loss at both large and small bends at the same time.

For example, single mode optical fibers with a low index trench in the cladding are being used for making fibers with low bend loss performance. These fibers have a trench where the depth of the trench is relatively constant across the width of the trench. In these designs, while the performance of the fiber at smaller diameters (~10 mm mandrel diameter) is excellent (<0.25 dB/turn), the performance at large diameters (~30 mm mandrel diameter) is not as good as in other bend optimized fibers that have been optimized for larger bend diameters. To improve the bend performance at both small and larger bend radii, fiber designs that include multiple trenches have been proposed. However, such an approach results in additional steps during processing and makes making of the fiber more costly.

SUMMARY

According to some embodiments a single mode optical fiber includes:

a central core region having outer radius $r_1$ and a relative refractive index delta $\Delta_{1max}$;

a cladding region comprising (i) a first inner cladding region having an outer radius $r_2 > 6$ microns and a relative refractive index delta $\Delta_2$ and $0.3 \leq r_1/r_2 \leq 0.85$; (ii) and a second inner cladding region having an outer radius $r_3 > 9$ microns and comprising a minimum relative refractive index delta $\Delta_{3min}$, wherein said second cladding region has at least one region with a relative refractive index delta that becomes more negative with increasing radius; and (iii) an outer cladding region surrounding the inner cladding region and comprising relative refractive index delta $\Delta_4$, wherein $\Delta_{1max} > \Delta_2 > \Delta_{3min}$, $\Delta_{3min} < \Delta_4$;

According to some embodiments, disclosed herein are optical fibers comprising a central core region having outer radius $r_1$ and a maximum relative refractive index delta $\Delta_{1max}$, a cladding comprising a first inner cladding region having an outer radius $r_2 > 8$ microns and a relative refractive index delta $\Delta_2$, a second inner cladding region having a relative refractive index delta $\Delta_3$ and a minimum relative refractive index delta $\Delta_{3min}$, wherein $\Delta_1 > \Delta_2 > \Delta_{3min}$, such that the difference between $\Delta_2$ and $\Delta_{3min}$ is greater than 0.15%, and an outer cladding region surrounding the two inner cladding regions. The fibers embodiments disclosed herein preferably exhibit a 22 m cable cutoff less than or equal to 1260 nm, a mode field diameter (MFD) at 1310 nm between 8.2 and 9.6 microns and a zero wavelength dispersion between 1300 and 1324 nm. In at least some fibers embodiments $r_1/r_2$ is greater than or equal to 0.25, more preferably greater than 0.3. Preferably $|\Delta_4 - \Delta_2| \geq 0.01$.

According to some other embodiments a single mode optical fiber includes:

a germania doped central core region having outer radius $r_1$, peak (maximum) relative refractive index delta in the central core region of $\Delta_{1,max}$; and the core region having a refractive index alpha profile, $\alpha_{core}$, with $\alpha_{core}$ between 1 and 100 (and for example, $1.8 \leq \alpha_{core} \leq 100$; $1.8 \leq \alpha_{core} \leq 2.2$; $2 \leq \alpha_{core} \leq 100$; $5 \leq \alpha_{core} \leq 100$; $2 \leq \alpha_{core} \leq 20$, or $5 \leq \alpha_{core} \leq 20$);

a cladding region comprising (i) a first inner cladding region having an outer radius $r_2 > 6$ microns and relative refractive index $\Delta_2$ and $0.3 \leq r_1/r_2 \leq 0.85$; (ii) and a second inner cladding region having an outer radius $r_3 > 9$ microns and comprising a minimum relative refractive index delta $\Delta_{3min}$, wherein said second cladding region has at least one region with a relative refractive index delta that becomes more negative with increasing radius; and (iii) an outer cladding region surrounding the inner cladding region and comprising relative refractive index $\Delta_4$, wherein $\Delta_1 > \Delta_2 > \Delta_3$, $\Delta_3 < \Delta_4$.

Disclosed herein are optical fiber embodiments comprising a central core region having outer radius $r_1$ and a maximum relative refractive index delta $\Delta_1$, a cladding region comprising a first inner cladding region having an outer radius $r_2 > 8$ microns and a relative refractive index delta $\Delta_2$, and a second inner cladding region surrounding the first inner cladding region and having relative refractive index $\Delta_3$, wherein $\Delta_{1\ max} > \Delta_2 > \Delta_{3min}$, and $\Delta_2 - \Delta_{3min}$ is $\geq 0.15$. The fibers disclosed herein preferably exhibit a 22 m cable cutoff less than or equal to 1260 nm, a mode field diameter (MFD) at 1310 nm between 8.2 and 9.6 microns and a zero wavelength dispersion between 1300 and 1324 nm. In these fibers some embodiments $r_1/r_2$ is greater than or equal to 0.25, more preferably greater than 0.3. Preferably, $|\Delta_4 - \Delta_2| \geq 0.01$.

Applicants discovered having a fiber with a trench that has a non-constant relative refractive index delta helps in achieving good macrobending performance at both small (<10 mm) and large (>20 mm) diameters. The following single mode fiber embodiments have an offset trench with a non-constant relative refractive index delta that decreases with an increasing radius in at least a region thereof, resulting in low macrobend loss and opticals (optical performance parameters) that are ITU-G.652 standards compliant. In at least some embodiments the index in the second inner cladding region decreases with increasing radial position.

In at least some embodiments the shape of the trench is defined by the parameter $$\beta = \frac{(R_3 - R_2)}{\Delta_{3,min}} \left(\frac{d\Delta}{dr}\right)_{average}, \text{ where } \left(\frac{d\Delta}{dr}\right)_{average}$$

is the average index slope in the second inner cladding region that is determined by averaging the index slope at different radial locations between $R_2$ and $R_3$. In some embodiments, the parameter $\beta$ is greater than 0.25, more preferably greater than 0.5 and even more preferably greater than 0.75. Preferably $\beta<1.5$. For fiber embodiments with a triangular trench the value of parameter $\beta$ is 1.

In at least some embodiments $\alpha_t \leq 50$, where is a trench alpha parameter. For some embodiments $0.5 \leq \alpha_t \leq 5$.

The moat volume ratio, $V_{3a3ratio}$, is defined as follows:

$$V_{3a3ratio} = V_{3a3}/[\Delta_{3min}(r_3^2 - r_2^2)]$$

Preferably the optical fibers herein have a moat volume ratio of $0.3 \leq V_{3a3ratio} \leq 0.8$.

Reference will now be made in detail to the present preferred embodiments, examples of which are illustrated in the accompanying drawings.

DETAILED DESCRIPTION OF THE PREFERRED EMBODIMENT

Figure 1A:
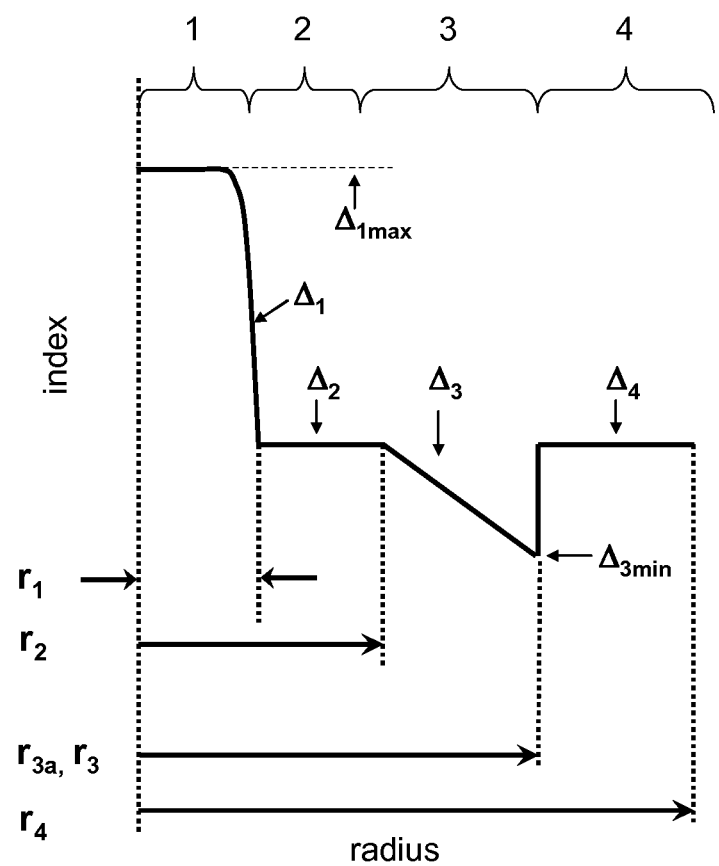
FIGS. 1A-1G show relative refractive index profiles corresponding to several embodiments of an optical fiber as disclosed herein.

Additional features and advantages will be set forth in the detailed description which follows and will be apparent to those skilled in the art from the description or recognized by practicing as described in the following description together with the claims and appended drawings.

The "refractive index profile" is the relationship between refractive index or relative refractive index and optical fiber radius. The radius for each segment of the relative refractive index profile is given by the abbreviations $r_1, r_2, r_3, r_4$, etc. and lower an upper case are used interchangeability herein (e.g., $r_1$ is equivalent to $R_1$).

The "relative refractive index percent" is defined as $\Delta\% = 100 \times (n_i^2 - n_c^2)/2n_i^2$, and as used herein $n_c$ is the average refractive index of the outer cladding region and unless otherwise specified is the refractive index of pure silica. As used herein, the relative refractive index is represented by $\Delta$ and its values are given in units of "%", unless otherwise specified. The terms: relative refractive index delta, delta, $\Delta$, $\Delta$ %, % $\Delta$, delta %, % delta and percent delta may be used interchangeability herein. In cases where the refractive index of a region is less than the average refractive index of the outer cladding, the relative index percent is negative and is referred to as having a depressed region or depressed index. In cases where the refractive index of a region is greater than the average refractive index of the outer cladding region, the relative index percent is positive. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. Examples of updopants include $GeO_2$ (germania), $Al_2O_3$, $P_2O_5$, $TiO_2$, Cl, Br. Examples of down dopants include fluorine and boron. For a person skilled in the art, it will be obvious that the relative index profiles disclosed herein can be modified such that entire index profile is shifted linearly up or down relative to the index of pure silica and result in similar optical properties of the resulting optical fibers.

"Chromatic dispersion", herein referred to as "dispersion" unless otherwise noted, of an optical fiber is the sum of the material dispersion, the waveguide dispersion, and the inter-modal dispersion. In the case of single mode optical fibers the inter-modal dispersion is zero. Zero dispersion wavelength is a wavelength at which the dispersion has a value of zero. Dispersion slope is the rate of change of dispersion with respect to wavelength.

"Effective area" is defined as:

$$A_{eff} = 2\pi (\int f^2 r dr)^2 / (\int f^4 r dr),$$

where the integration limits are 0 to $\infty$, and f is the transverse component of the electric field associated with light propagated in the optical fiber. As used herein, "effective area" or "$A_{eff}$" refers to optical effective area at a wavelength of 1550 nm unless otherwise noted.

The term "$\alpha$-profile" refers to a relative refractive index profile of the region (e.g., core region), expressed in terms of $\Delta(r)$ which is in units of "%", where r is radius. The $\alpha$-profile of the core (which is defined by the core alpha, or $\text{alpha}_{core}$ herein) follows the equation, $$\Delta(r) = \Delta(r_o)(1 - [|r - r_o|/(r_1 - r_o)]^\alpha),$$

where $r_o$ is the point at which $\Delta(r)$ is maximum, the radius r is moving radially outward from the centerline, $r_1$ is the radial location at which $\Delta(r)$ % first reaches the value 0.03%, and r is in the range $r_i \leq r \leq r_f$, where $\Delta$ is defined above, $r_i$ is the initial point of the $\alpha$-profile, $r_f$ is the final point of the $\alpha$-profile, and $\alpha$ is an exponent which is a real number.

The mode field diameter (MFD) is measured using the Peterman II method wherein, 2w=MFD, and $w^2 = (2\int f^2 r dr / \int [df/dr]^2 r dr)$, the integral limits being 0 to $\infty$.

The bend resistance of an optical fiber can be gauged by induced attenuation under prescribed test conditions, for example by deploying or wrapping the fiber around a mandrel of a prescribed diameter, e.g., by wrapping 1 turn around a either a 6 mm, 10 mm, 20 mm, 30 mm or similar diameter mandrel (e.g. "1×10 mm diameter macrobend loss" or the "1×30 mm diameter macrobend loss") and measuring the increase in attenuation per turn.

One type of bend test is the lateral load microbend test. In this so-called "lateral load" test (LLWM), a prescribed length of optical fiber is placed between two flat plates. A #70 wire mesh is attached to one of the plates. A known length of optical fiber is sandwiched between the plates and a reference attenuation is measured while the plates are pressed together with a force of 30 Newtons. A 70 Newton force is then applied to the plates and the increase in attenuation in dB/m is measured. The increase in attenuation is the lateral load attenuation of the optical fiber in dB/m at a specified wavelength (typically within the range of 1200-1700 nm, e.g., 1310 nm or 1550 nm or 1625 nm).

Another type of bend test is the wire mesh covered drum microbend test (WMCD). In this test, a 400 mm diameter aluminum drum is wrapped with wire mesh. The mesh is wrapped tightly without stretching, and should have no holes, dips, or damage. Wire mesh material specification: McMaster-Carr Supply Company (Cleveland, Ohio), part number 85385T106, corrosion-resistant type 304 stainless steel woven wire cloth, mesh per linear inch: 165×165, wire diameter: 0.0019", width opening: 0.0041", open area (%): 44%. A prescribed length (750 meters) of optical fiber is wound at 1 m/s on the wire mesh drum at 0.050 centimeter take-up pitch while applying 80 (+/−1) grams tension. The ends of the prescribed length of fiber are taped to maintain tension and there are no fiber crossovers. The attenuation of the optical fiber is measured at a specified wavelength (typically within the range of 1200-1700 nm, e.g., 1310 nm or 1550 nm or 1625 nm); a reference attenuation is measured on the optical fiber wound on a smooth drum. The increase in attenuation is the wire mesh covered drum attenuation of the optical fiber in dB/km at a specified wavelength (typically within the range of 1200-1700 nm, e.g., 1310 nm or 1550 nm or 1625 nm).

The "pin array" bend test is used to compare relative resistance of optical fiber to bending. To perform this test, attenuation loss is measured for a optical fiber with essentially no induced bending loss. The optical fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm During testing, sufficient tension is applied to make the optical fiber conform to a portion of the pin surface. The increase in attenuation is the pin array attenuation in dB of the optical fiber at a specified wavelength (typically within the range of 1200-1700 nm, e.g., 1310 nm or 1550 nm or 1625 nm).

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

Fiber cutoff is measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

By cabled cutoff wavelength, or "cabled cutoff" as used herein, we mean the 22 m cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards.

Unless otherwise noted herein, optical properties (such as dispersion, dispersion slope, etc.) are reported for the LP01 mode.

Applicants discovered that putting an off-set trench with a non-constant depth in the profile of a single mode fiber can simultaneously improve bend performance at both small (≤5 mm) and large (≥10 mm) bend radii. The following fiber embodiments result in low bend performance at small and large bend diameters and have other opticals that are G.652 standards compliant (MFD between 8.2 and 9.6 microns at 1310 nm, a zero dispersion wavelength between 1300 and 1324 nm, cable cutoff wavelength less than or equal to 1260 nm). Optical fibers disclosed herein are capable of exhibiting an effective area at 1310 nm which is between 52 and 72 microns$^2$. Optical fibers disclosed herein are capable of exhibiting an effective area at 1550 nm which is between 75 and 90 microns$^2$.

Preferably MFD (at a wavelength of 1310 nm) of the optical fiber 10 is between 8.2 μm and 9.6 μm. For example, 8.2 microns≤MFD≤ and 9.6 microns, or 8.5 μm≤MFD≤ and 9.4 microns (e.g., 8.6, 8.8, 9, 9.2, 9.4, 9.6 microns, or therebetween).

Figure 1B:
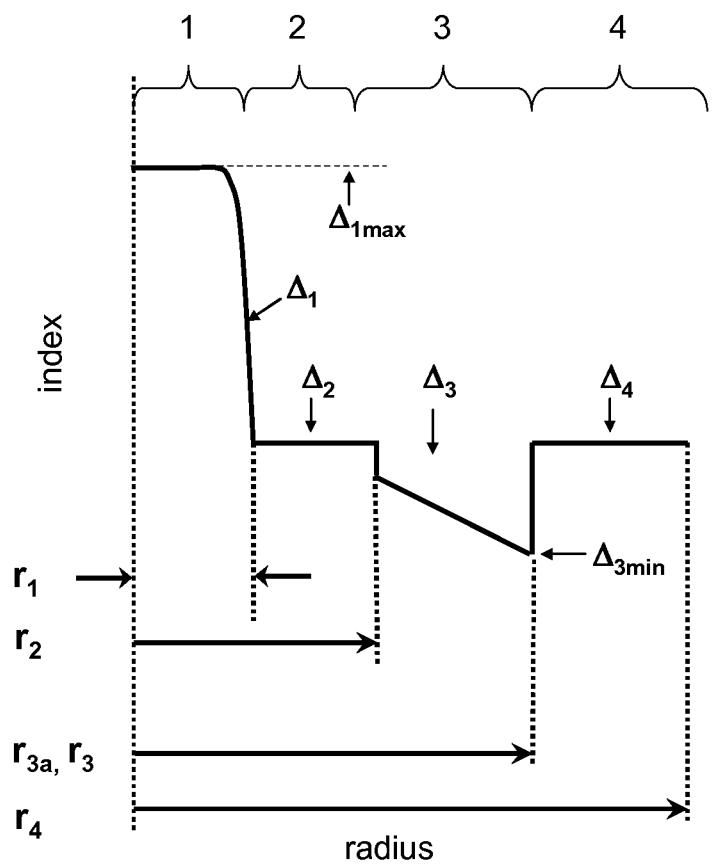
Figure 1C:
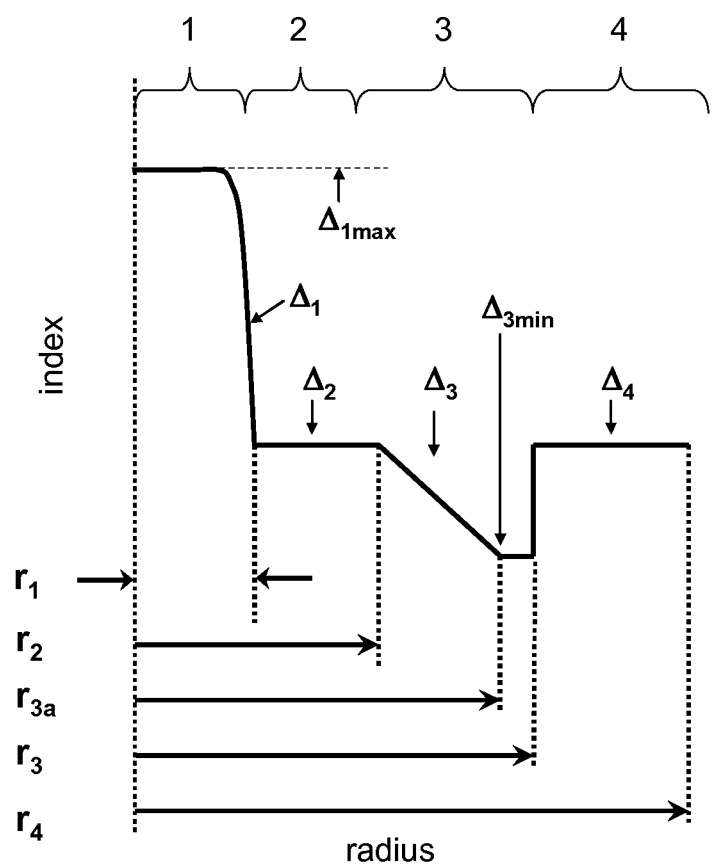
Figure 1D:
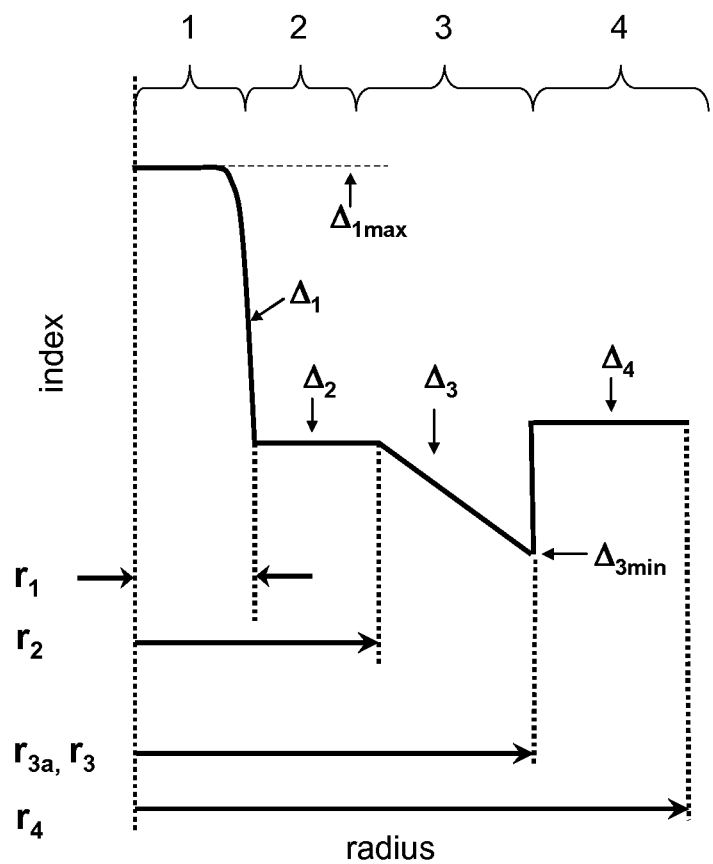
Figure 1E:
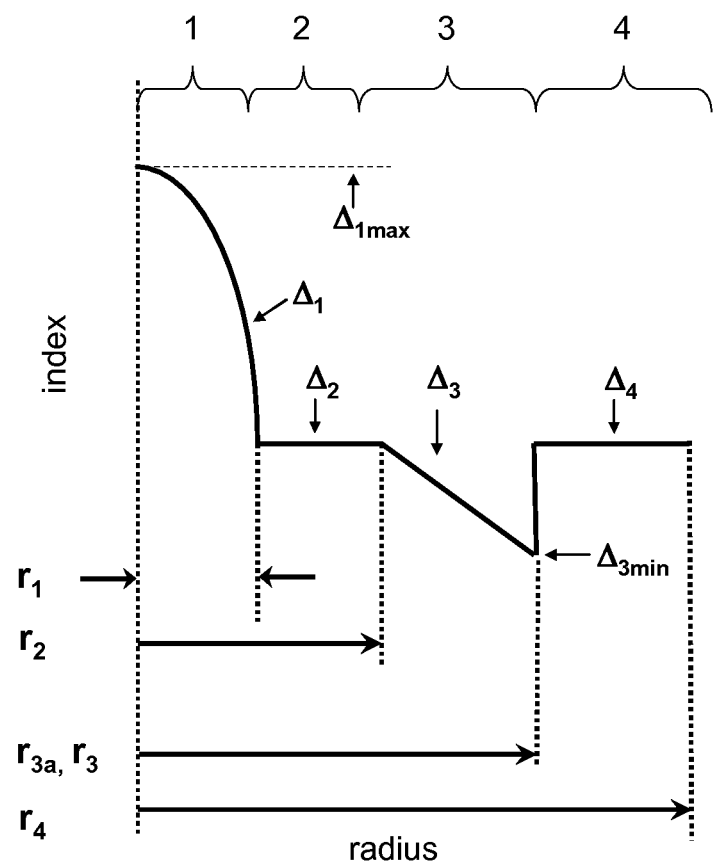

Several relative refractive index profiles of an exemplary fiber 10 are shown in FIGS. 1A-1G. Optical fibers 10 of FIGS. 1A-1G include a central glass core region 1 (or core) comprising maximum relative refractive index delta percent $\Delta_{1max}$. The core may have a step index profile or a graded index profile (also referred to as a gradient index profile herein). A first inner cladding region 2 surrounds central core region 1, the first inner cladding region 2 comprising refractive index delta percent $\Delta_2$. A second inner cladding region 3 (also referred to as a trench herein) surrounds the first inner clad region 2, the second inner cladding region 3 comprising refractive minimum index delta percent $\Delta_{3\ min}$. The second inner cladding region 3 does not have a constant $\Delta_3(r)$. Preferably $\Delta_3(r)$ decreases with increasing radius and may have a triangular cross-section. Thus, in some embodiments minimum relative refractive index $\Delta_3$ of this region occurs at $r=r_3$ (i.e., $\Delta_3(r=r_3)=\Delta_{3min}$). The outer cladding region 4 surrounds second inner cladding region 3 and comprises relative refractive index delta percent $\Delta_4$. As shown in FIGS. 1A-1G, the second inner cladding region 3 is offset from the core region 1, such that the first inner cladding region 2 is sandwiched between the central glass core region 1 and the second inner cladding region 3. Outer cladding region 4 surrounds second inner cladding region 3 (trench) and comprises $\Delta_4$. FIG. 1A illustrates a relative refractive index profile $\Delta_3(r)$ of an embodiment of fiber 10 that has a triangular trench profile. This figure shows that the relative refractive index of the second inner cladding region 3 monotonically decreases with increasing radius, and $\Delta_3(r_2)>\Delta_3(r_3)$. In the embodiment of FIG. 1A $\Delta_2=\Delta_4$. However, $\Delta_2$ does not need to be the same as $\Delta_4$ (e.g., $\Delta_2$ may be larger or smaller than $\Delta_4$). Preferably $\Delta_4 \geq \Delta_2$. For example, FIG. 1D illustrates relative refractive index profile of an embodiment of fiber 10 that also has a triangular trench profile and that is similar to the profile of FIG. 1A, but in FIG. 1D $\Delta_4>\Delta_2$. In some embodiments, $\Delta_4-\Delta_2$ is between 0.01% and 0.1%, in other embodiments between 0.02% and 0.05%. FIG. 1B illustrates a relative refractive index profile of embodiment of fiber 10 that has a trapezoid-shaped trench profile. In this embodiment the refractive index of the second inner cladding region 3 also decreases with increasing radius, and $\Delta_3(r_2)>\Delta_3(r_3)$. In the embodiment of FIG. 1B $\Delta_2=\Delta_4$, but in some embodiments $\Delta_2$ and $\Delta_4$ have different values (e.g., $\Delta_2>\Delta_4$, or $\Delta_2<\Delta_4$). FIG. 1C illustrates a relative refractive index profile of another embodiment of fiber 10. In this embodiment the refractive index of the second inner cladding region 3 monotonically decreases with increasing radius until it reaches a value $r=r_{3A}$, and then is constant between the radii $r_{3A}$ and $r_3$. In this embodiment $\Delta_3(r_2) > \Delta_3(r_3)$. In the embodiment of FIG. 1C $\Delta_2 = \Delta_4$ but in some embodiments $\Delta_2$ and $\Delta_4$ have different values (e.g., $\Delta_2 > \Delta_4$, or $\Delta_2 < \Delta_4$). In some embodiments $0.05\% \geq |\Delta_2 - \Delta_4| \geq 0.01\%$. FIG. 1E illustrates relative refractive index profile of an embodiment of fiber 10 that also has a triangular trench profile and that is similar to the profile of FIG. 1A, but in FIG. 1E the central core region has a maximum refractive index delay percent $\Delta_{1max}$ and a refractive index alpha profile $\alpha_{core}$. Optical fibers 10 may have cores with the alpha values ranging as $1 \leq \alpha_{core} \leq 100$. In some preferred embodiments $5 \leq \alpha_{core} \leq 100$, in other preferred embodiments $2 \leq \alpha_{core} \leq 20$, or $5 \leq \alpha_{core} \leq 20$.

Figure 1F:
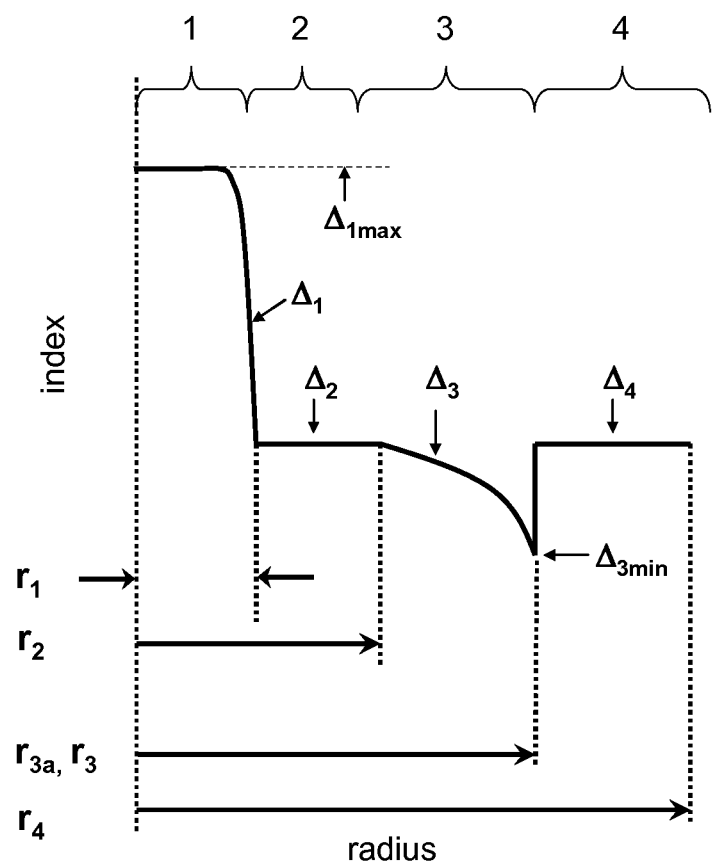
Figure 1G:
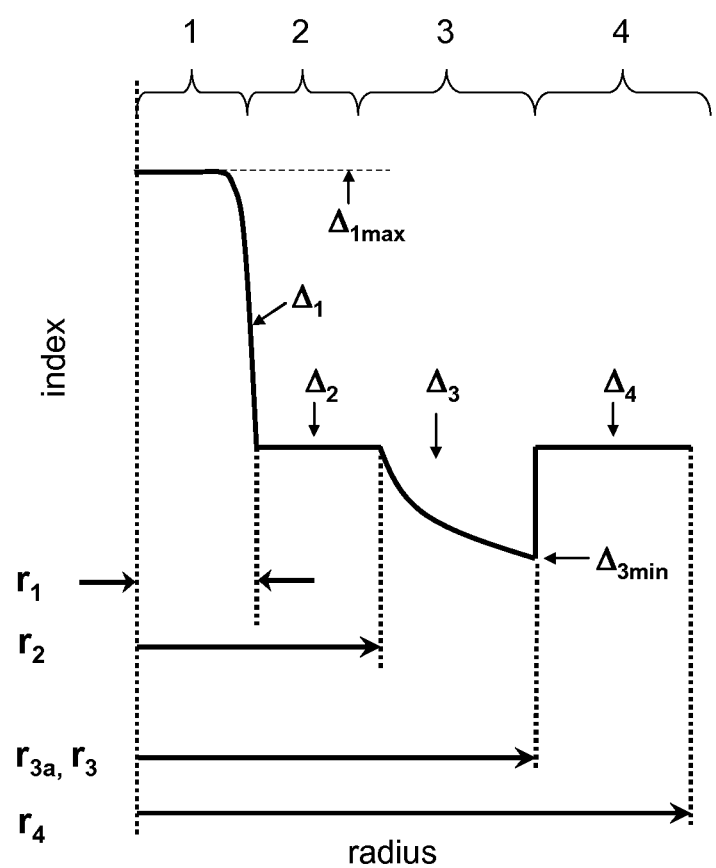

In at least some embodiments $\alpha_r \leq 50$, where $\alpha_r$, is a trench alpha parameter. For some embodiments, $0.5 \leq \alpha_r \leq 5$. FIG. 1F illustrates relative refractive index profile of an embodiment of fiber 10 that also has a trench profile that is similar to the profile of FIG. 1A, but in FIG. 1F the relative refractive index profile of the second inner cladding region 3 has a shape that is convex. FIG. 1G illustrates relative refractive index profile of an embodiment of fiber 10 that also has a trench profile and that is similar to the profile of FIG. 1A, but in FIG. 1G the relative refractive index profile of the second inner cladding region 3 has a shape that is concave.

In the exemplary embodiments, $\Delta_{1max} > \Delta_2 > \Delta_{3min}$ and $\Delta_{3min} < \Delta_4$. Preferably $\Delta_2 - \Delta_{3min} \geq 0.1\%$; more preferably $\Delta_2 - \Delta_{3min} \geq 0.15\%$, even more preferably $\Delta_2 - \Delta_3 \geq 0.2\%$. In the embodiments illustrated in FIGS. 1A through 1G, regions 1, 2, 3 are immediately adjacent one another. However, this is not required, and alternatively additional optional core or cladding regions may be employed. For example (not shown), another region (2A) may be situated between the core and the region 3. The optional inner cladding region 2A may be may be directly adjacent to and surround core region 1 and comprise a higher or a lower relative refractive index delta percent $\Delta_{2A}$ than that of the annular region 2 (i.e., $\Delta_{2A} < \Delta_2$, or $\Delta_{2A} > \Delta_2$).

The index of refraction (and thus the relative refractive index delta) of the second inner cladding region 3 (the trench) preferably decreases with increasing radial position. The shape of the second inner cladding region 3 is defined by the parameter $$\beta = \frac{(R_3 - R_2)}{\Delta_{3,min}}\left(\frac{d\Delta}{dr}\right)_{average}, \text{ where } \left(\frac{d\Delta}{dr}\right)_{average}$$

is the average index slope in the second inner cladding region that is determined by averaging the index slope at different radial locations between $R_2$ and $R_3$. For a triangular trench the value of parameter $\beta$ is 1. For a rectangular trench, the value of parameter $\beta$ is 0. In other embodiments of optical fiber 10, the parameter $\beta$ is greater than 0.25, more preferably greater than 0.5 and even more preferably greater than 0.75. Preferably, $\beta$ is less than 1.5, and more preferably less than 1.1.

Another parameter that can be used to define the trench shape in the second inner cladding region 3 is the parameter, $\alpha_t$, which refers to a relative refractive index profile in the second inner cladding region 3, expressed in terms of $\Delta(r)$ which is in units of "%", where r is radius, which follows the equation, $$\Delta(r) = \Delta_{3,min}(1 - [|r_3 - r|/(r_3 - r_2)]^{\alpha_t} t),$$

where $\alpha_t$ is the trench alpha parameter. For a rectangular trench, the value of parameter $\alpha_t$ is greater than 100, while for a triangular trench the value of parameter $\alpha_t$ is 1. Preferably $\alpha_t \leq 50$. In some embodiments of optical fiber 10, the parameter $\alpha_t$ is $0.5 \leq \alpha_t \leq 5$, in some embodiments $0.5 \leq \alpha_t \leq 3$, and in some embodiments $0.75 \leq \alpha_t \leq 2$.

Preferably, according to the exemplary embodiments disclosed herein the optical fibers have the moat volume ratio of $0.3 \leq V_{3a3ratio} \leq 0.8$, where $V_{3a3ratio}$, is:

$$V_{3a3ratio} = V_{3a3}/[\Delta_{3min}(r_3^2 - r_2^2)]$$

Central core region 1 comprises an outer radius $r_1$, $r_1$ is the point when the radius r moving radially outward from the centerline corresponds to at the value at which $\Delta(r)$ % first reaches 0.03%. Core region 1 (also referred to as a core herein) preferably exhibits a maximum relative refractive index delta percent, $\Delta_{1\ max}$, between about 0.3 to 0.5, more preferably between about 0.31 to 0.48, for example between about 0.31 to 0.45. In some embodiments, $\Delta_{1max}$ is between 0.31 and 0.43. In some embodiments $\Delta_{1max}$ is less than 0.42. Core radius $r_1$ is preferably between 3 and 10 microns, more preferably between about 3.5 to 8.0 microns, for example $3.5 \leq r_1 \leq 7.0$ microns, or $3.5 \leq r_1 \leq 5.0$ microns. Central core region 1 may comprise a single segment, step index profile. In some embodiments, central core region 1 exhibits an alpha profile with an alpha ($\alpha_{core}$) value greater than 0.5 and less than 10, and in some embodiments less than 7.5, less than 5, or less than 3 (for example, between 1.8 and 2.2, such as 1.85, 1.95, 1.98, 2, 2.05, 2.1 or therebetween). However, in other embodiments, central core region 1 may comprise an alpha, $\alpha_{core}$ between about 2 and about 100; or between 10 and 40, such as 15, 20, 30, or therebetween), and in some cases $5 \leq alpha_{core} \leq 20$.

In some preferred embodiments, central core region 1 exhibits an $5 \leq alpha_{core} \leq 20$, and a core region 1 having a relative refractive index delta percent, $\Delta_1$ between 0.30 to 0.48 (e.g., $0.32 \leq \Delta_1 \leq 0.4$). In some preferred embodiments, central core region 1 exhibits an alpha $5 \leq alpha_{core} \leq 20$, and a core region 1 having a refractive index delta percent, $\Delta_{1max}$ between 0.3 to 0.48 (e.g., $0.32 \leq \Delta_1 \leq 0.4$), and a core radius between about 3.5 to 7 microns. In some preferred embodiments, central core region 1 exhibits an alpha greater than 0.5 and less than 10, and in some embodiments less than 7.5, less than 5, or less than 3, and a core region 1 has a relative refractive index delta percent, $\Delta_1$ between 0.30 to 0.48 (e.g., $0.32 \leq \Delta_1 \leq 0.4$). In some embodiments, central core region 1 exhibits an alpha greater than 0.5 and less than 10, and in some embodiments less than 7.5, less than 5, or less than 3, and a core region 1 having a refractive index delta percent, $\Delta_{1max}$ between 0.3 to 0.48 (e.g., $0.32 \leq \Delta_1 \leq 0.4$), and a core radius between about 3.5 to 7 microns.

In the embodiment illustrated in FIG. 1, inner cladding region 2 surrounds central core region 1 and comprises inner radius $r_1$ and outer radius $r_2$, $r_1$ being defined as above and $r_2$ which is defined as the first radial location moving away radially outward from $r_1$ where the relative refractive index is equal to $0.03(\Delta_{3min})$. In some cases the refractive index in region 2 is essentially flat, in other cases there can be a gradient index profile, and in some embodiments region 2 decreases in refractive index as radius increases. Still in other cases there can be fluctuations as a result of small profile design or process variations (see, for example, FIG. 6). In some embodiments, the first inner cladding region 2 contains less than 0.02 wt % fluorine. In some embodiments, the inner cladding region 2 comprises silica which is substantially undoped with either fluorine or germania, i.e., such that the region is essentially free of fluorine and germania. In some other embodiments, region 2 is doped with fluorine that is less than 0.2 wt %. The inner cladding region 2 preferably exhibits a width between about 1 to 13 microns, more preferably 2 to 10 microns, even more preferably between about 2 to 7 microns. Preferably, 6 microns≤$r_2$≤15 microns, more preferably 6.5 microns≤$r_2$≤12 microns. The ratio of the core radius $r_1$ over the inner cladding region 2 radius $r_2$ is preferably at least 0.3 and less than 1, more preferably greater than 0.3, for example, between about 0.33 and 0.85, or between 0.33 and 0.7, or between 0.4 to 0.6.

Inner cladding region 2 comprises refractive index delta percent $\Delta_2$ which is calculated using:

$$\Delta_2 = \int_{r1}^{r2} \Delta(r)\,dr/(r_2 - r_1) \quad \text{Eq. 1}$$

In some embodiments, the first inner cladding region 2 comprises silica which is substantially undoped with either fluorine or germania, i.e., such that the region is essentially free of fluorine and germania. Inner cladding region 3 preferably includes a down-dopant, for example fluorine to provide a minimum relative refractive index delta that is lower than that of region 2. In the embodiments illustrated in FIGS. 1A-1G, the second inner cladding region 3 (also referred to as trench) surrounds the first inner cladding region 2 and comprises inner radius $r_2$ and outer radius $r_3$, $r_2$ being defined as above and $r_3$ being defined as where the relative refractive index profile curve again crosses the zero delta line ($\Delta_4$) at the first radial location moving away radially outward from the radius $r_2$. In some cases the relative refractive index in region 3 can be a gradient index profile, in some cases (preferably) the relative refractive index in region 3 has a shallower depression in the inner part of the region and a deeper depression in the outer part of the region. In addition, there can be fluctuations as a result of small profile design or process variations. In some embodiments the second inner cladding region 3 includes fluorine and/or boron. In some embodiments, the depressed-index annular portion comprises voids, either non-periodically disposed, or periodically disposed, or both. By "non-periodically disposed" or non-periodic distribution", we mean that when one takes a cross section (such as a cross section perpendicular to the longitudinal axis) of the optical fiber, the non-periodically disposed voids are randomly or non-periodically distributed across a portion of the fiber. Similar cross sections taken at different points along the length of the fiber will reveal different cross-sectional hole patterns, i.e., various cross sections will have different hole patterns, wherein the distributions of voids and sizes of voids do not match. That is, the voids or voids are non-periodic, i.e., they are not periodically disposed within the fiber structure. These voids are stretched (elongated) along the length (i.e. parallel to the longitudinal axis) of the optical fiber, but do not extend the entire length of the entire fiber for typical lengths of transmission fiber. The voids can contain one or more gases, such as argon, nitrogen, krypton, $CO_2$, $SO_2$, or oxygen, or the voids can contain a vacuum with substantially no gas; regardless of the presence or absence of any gas, the relative refractive index in the annular portion 3 is lowered due to the presence of the voids. While not wishing to be bound by theory, it is believed that the voids extend less than a few meters, and in many cases less than 1 meter along the length of the fiber. Optical fibers disclosed herein can be made by methods which utilize preform consolidation conditions which are effective to result in a significant amount of gases being trapped in the consolidated glass blank, thereby causing the formation of voids in the consolidated glass optical fiber preform. Rather than taking steps to remove these voids, the resultant preform is used to form an optical fiber with voids, or voids, therein. As used herein, the diameter of a hole is the longest line segment whose endpoints are disposed on the silica internal surface defining the hole when the optical fiber is viewed in perpendicular cross-section transverse to the longitudinal axis of the fiber. Inner cladding region 3 comprises relative refractive index delta percent $\Delta_3$ (r), and the minimum relative refractive index delta $\Delta_{3\,min}$. The minimum index in the second inner cladding region $\Delta_{3\,min}$ is preferably less than −0.1% (i.e., $\Delta_4$−$\Delta_3$≥0.1%), in some embodiments less than −0.25%, and in some other embodiments less than −0.35%.

The volume $V_3$ of the second inner cladding region 3 (the trench), is defined as shown in Eq. 2, and given in units of percent delta micron square (% $\Delta$microns$^2$)

$$V_3 = 2\int_{r2}^{r3} \Delta_{(2-3)}(r)r\,dr \quad \text{Eq. 2}$$

In the embodiments of FIGS. 1A-1D the absolute volume $V_3$ of the inner cladding region 3 is 10 $\Delta$ % micron$^2$≤$V_3$≤105 $\Delta$ % microns$^2$, in some embodiments 20 $\Delta$ % microns$^2$≤$V_3$≤95 $\Delta$ % microns$^2$. The inner cladding region 3 preferably exhibits a width $W_3$, (i.e., $r_3$−$r_2$), of about 5≤($r_3$−$r_2$)≤20 microns, in some embodiments 5≤($r_3$−$r_2$)≤15 microns. In some embodiments of FIGS. 1A-1D the absolute volume $V_3$ of the inner cladding region 3 is 35 $\Delta$ % microns$^2$≤$V_3$≤105 $\Delta$ % microns$^2$, for example, 50 $\Delta$ % microns$^2$≤$V_3$≤95 $\Delta$ % microns$^2$, (e.g., greater than 70 $\Delta\mu m^2$, and in some embodiments greater than 85 $\Delta\mu m^{32}$) The inner cladding region 3 preferably exhibits a width W between about 5 to 20 microns, more preferably 5 to 15 microns. The ratio of the core radius $r_3$ over the inner cladding region 2 radius $r_2$ is preferably greater than 1.3, more preferably between 1.5 and about 4.

Outer cladding region 4 surrounds the depressed annular region 3 and comprises relative refractive index delta percent $\Delta_4$ which is higher than the index $\Delta_{3\,min}$ of inner cladding region 3. In some embodiments outer cladding region 4 has relative refractive index greater than that of first inner cladding region 2, thereby forming a region which is an "updoped" outer cladding region 4 with respect to first inner cladding region 2, e.g. by adding an amount of dopant (such as germania or chlorine) sufficient to increase the relative refractive index of the outer cladding region 4. Note, however, that it is not critical that region 4 be updoped in the sense that an index increasing dopant must be included in region 4. Indeed, the same sort of raised index effect in outer cladding region 4 may be achieved by downdoping first inner cladding region 2 with respect to outer cladding region 4. Outer cladding region 4 comprises a higher relative refractive index than first inner cladding region 2, and may comprises relative refractive index delta percent $\Delta_4$ which is greater than 0.01%, and in some embodiments be greater than 0.02% or 0.03%, relative to relative refractive index in the first inner cladding region 2. Preferably, the higher index portion (compared to first inner cladding region 2) of outer cladding region 4 extends at least to the point where the optical power which would be transmitted through the optical fiber is greater than or equal to 90% of the optical power transmitted, more preferably to the point where the optical power which would be transmitted through the optical fiber is greater than or equal to 95% of the optical power transmitted, and most preferably to the point where the optical power which would be transmitted through the optical fiber is greater than or equal to 98% of the optical power transmitted. In many embodiments, this is achieved by having the "updoped" third annular region extend at least to a radial point of about 30 microns. Consequently, the volume $V_4$ of the third annular region 4, is defined herein being calculated between radius $r_3$ and $r_{30}$ (the radius at 30 microns) and thus is defined as $$V_4 = 2\int_{r3}^{r30} \Delta_{(4-2)}(r)r\,dr \qquad \text{Eq. 4}$$

The volume $V_4$ of the outer cladding region 4 (inside 30 microns) compared to that of the first inner cladding region 2, is preferably greater than 5 $\Delta$ % microns$^2$, more preferably greater than 7 $\Delta$ % microns$^2$, and may be greater than 10% $\Delta$ microns$^2$. This volume $V_4$ of the outer cladding region (inside 30 microns) is in some embodiments less than 50% $\Delta$ microns$^2$.

In some embodiments, the relative refractive index $\Delta_4$ of the outer cladding region 4 is greater than first inner cladding index $\Delta_2$ by 0.01%, more preferably greater than 0.02%. In some embodiments, the outer cladding region 4 comprises chlorine (Cl). In some embodiments the outer cladding region includes germania (GeO$_2$).

The core region 1 preferably has a positive relative refractive index throughout. The core 1 comprises a maximum relative refractive index $\Delta_{1MAX}$ occurring between $r=0$ and $r=3$ μm. $\Delta_{1MAX}$ is preferably between 0.30% and 0.48%, and even more preferably 0.3% to 0.45%.

The first inner cladding region 2 preferably has a substantially constant relative refractive index profile, i.e. the difference between the relative refractive index at any two radii within the intermediate region is less than 0.02%, and in some preferred embodiments less than 0.01%. Thus, the relative refractive index profile of the first inner cladding region 2 preferably has a substantially flat shape. In some embodiments the outer cladding region 4 is updoped relative to pure silica and in some embodiments the first inner cladding region 2 is downdoped relative to pure silica.

The core region 1 may be a step index core, and may comprise an alpha ($\alpha$) shape. In preferred embodiments, $r_1$ is less than 8.0 microns, and more preferably is between 3.5 microns and 7.0 microns. The fibers are capable of exhibiting mode field diameter at 1310 nm between 8.2 and 9.6 microns, zero dispersion wavelength between 1300 and 1324 nm, cable cutoff less than or equal to 1260 nm and a bend loss of less than 2, and preferably less than 1 dB/turn when wound upon on a 10 mm radius mandrel.

The fibers disclosed herein may be drawn from optical fiber preforms made using conventional manufacturing techniques and using known fiber draw methods and apparatus, for example as is disclosed in U.S. Pat. No. 7,565,820, the specification of which is hereby incorporated by reference.

Various exemplary embodiments will be further clarified by the following examples. It will be apparent to those skilled in the art that various modifications and variations can be made without departing from the spirit or scope of the claims.

FIBER EXAMPLES 1-6

Tables 1A, 1B, 2A, 2B, 3-5 below list characteristics of modeled illustrative examples 1-6 and 8-27, manufactured fiber example 7, and those of the two comparative example fibers. In particular, set forth below for each example of Table 1A and 1B is the relative refractive index delta $\Delta_1$, alpha, and outer radius $r_1$ of the central core region 1, relative refractive index delta $\Delta_2$ and outer radius $r_2$ first inner cladding region 2, relative refractive index delta $\Delta_3$ and volume $V_3$ of the second inner cladding region 3, relative refractive index delta $\Delta_4$ and volume $V_4$ of the outer cladding region 4, which is calculated between inner radius $r_3$ of outer cladding region 3 and a radial distance of 30 microns, and a moat volume ratio.

TABLE 1A

| Parameter | Comparative Example 1 | Exemplary embodiment 1 | Exemplary embodiment 2 | Exemplary embodiment 3 |
|---|---|---|---|---|
| $\Delta_{1max}$ (%) | 0.35 | 0.35 | 0.35 | 0.39 |
| $\alpha$ | 20 | 20 | 20 | 2 |
| $r_1$ (microns) | 4.0 | 4.0 | 4.0 | 5.4 |
| $\Delta_2$ (%) | 0.00 | 0.00 | 0.00 | 0.00 |
| $r_2$ (microns) | 9.5 | 7.6 | 7.6 | 6.6 |
| $\Delta_3$ (%) | −0.28 | −0.40 | −0.40 | −0.40 |
| $r_3$ (microns) | 16.8 | 16.8 | 17.9 | 18.2 |
| $V_3$ (% $\Delta$ microns) | 53.75 | 50.54 | 59.6 | 66.3 |
| Shape of Trench | Rectangular | Triangular | Triangular | Triangular |
| $\Delta_4$ (%) | 0.00 | 0.00 | 0.00 | 0.00 |
| $r_4$ (microns) | 62.5 | 62.5 | 62.5 | 62.5 |
| $r_1/r_2$ | 0.421 | 0.526 | 0.565 | 0.818 |
| $r_3/r_2$ | 1.77 | 2.21 | 2.36 | 2.76 |
| Parameter β | 0 | 1 | 1 | 1 |
| Parameter $\alpha_r$ | 100 | 1 | 1 | 1 |
| $V_4$ (% $\Delta$ microns) | 0 | 0 | 0 | 0 |

TABLE 1B

| Parameter | Comparative Example 2 | Exemplary embodiment 4 | Exemplary embodiment 5 | Exemplary embodiment 6 |
|---|---|---|---|---|
| $\Delta_{1max}$ (%) | 0.34 | 0.34 | 0.34 | 0.44 |
| $\alpha$ | 20 | 20 | 20 | 2 |
| $r_1$ (microns) | 4.0 | 4.0 | 4.0 | 5.4 |
| $\Delta_2$ (%) | 0.00 | 0.00 | 0.00 | 0.00 |
| $r_2$ (microns) | 9.5 | 6.6 | 6.6 | 7.5 |
| $\Delta_3$ (%) | −0.40 | −0.40 | −0.40 | −0.44 |
| $r_3$ (microns) | 16.8 | 20.8 | 22.1 | 19.0 |
| $V_3$ (% $\Delta$ microns) | 76.79 | 91.26 | 105 | 105.6 |
| Shape of Trench | Rectangular | Triangular | Triangular | Convex |
| $\Delta_4$ (%) | 0.00 | 0.00 | 0.00 | 0.00 |
| $r_4$ (microns) | 62.5 | 62.5 | 62.5 | 62.5 |
| $r_1/r_2$ | 0.42 | 0.606 | 0.606 | 0.72 |
| $r_3/r_2$ | 1.76 | 3.15 | 3.35 | 2.53 |
| Parameter β | 0 | 1 | 1 | 1 |
| Parameter $\alpha_r$ | >100 | 1 | 1 | 0.5 |
| $V_4$ (% $\Delta$ microns) | 18.53 | 14.02 | 13.64 | 21.56 |

Also set forth (Tables 2A, 2B) are modeled data including: theoretical cutoff wavelength in nm, chromatic dispersion and dispersion slope at 1310 nm, chromatic dispersion and dispersion slope at 1550 nm, mode field diameter at 1310 nm and 1550 nm, effective area Aeff at 1550 nm, lateral load wire mesh microbend at 1550 nm, pin array macrobend at 1550 nm, zero dispersion wavelength, 22 m cable cutoff, 1×10 and 1×30 mm diameter induced bend losses in dB per turn at 1550 nm, and kappa value (dispersion D divided by the dispersion slope).

More specifically, the exemplary fiber embodiments Tables 1A, 1B, 2A and 2B have core alpha values between 2 and 20, core radii between about 4 and about 5.5 microns, and 0.3%<$\Delta_{1MAX}$<0.4%. Most of these fiber embodiments have a bend loss of less than 0.5 dB/turn (at 1550 nm) when bent around 10 mm diameter mandrel, and less than 0.01 dB/turn when bent around 30 mm mandrel.

TABLE 2A

| Parameter | Comparative Example 1 | Exemplary Embodiment 1 | Exemplary Embodiment 2 | Exemplary Embodiment 3 |
|---|---|---|---|---|
| Cutoff (nm) | 1150 | 1150 | 1151 | 1150 |
| MFD at 1310 nm (microns) | 8.7 | 8.7 | 8.7 | 9.0 |
| Aeff at 1310 nm (microns$^2$) | 59.1 | 59.0 | 59.1 | 61.4 |
| Dispersion at 1310 nm (ps/nm/km) | −0.49 | −0.56 | −0.62 | −0.45 |
| Slope at 1310 nm (ps/nm$^2$/km) | 0.0888 | 0.0880 | 0.0878 | 0.0918 |
| kappa at 1310 nm (nm) | −5.6 | −6.3 | −7.0 | −4.9 |
| MFD at 1550 nm (microns) | 9.9 | 9.9 | 9.9 | 10.2 |
| Aeff at 1550 nm (microns$^2$) | 74.2 | 74.2 | 74.5 | 78.0 |
| Dispersion at 1550 nm (ps/nm/km) | 17.2 | 16.9 | 16.8 | 17.7 |
| Slope at 1550 nm (ps/nm$^2$/km) | 0.0635 | 0.0632 | 0.0621 | 0.0641 |
| kappa at 1550 nm (nm) | 271.3 | 271.3 | 270.3 | 275.8 |
| Lateral load at 1550 nm (dB) | 0.3 | 0.4 | 0.3 | 0.4 |
| Pin array at 1550 nm (dB) | 10.5 | 11.0 | 10.1 | 11.2 |
| Zero Dispersion Wavelength (nm) | 1315 | 1316 | 1316 | 1315 |
| Cable Cutoff (nm) | <1260 | <1260 | <1260 | <1260 |
| Bend loss per turn on a 10 mm mandrel diameter (dB/turn) | 0.47 | 0.67 | 0.50 | 0.49 |
| Bend loss per turn on a 30 mm mandrel diameter (dB/turn) | 0.0033 | 0.0038 | 0.0022 | 0.0037 |

TABLE 2B

| Parameter | Comparative Example 2 | Exemplary embodiment 4 | Exemplary embodiment 5 | Exemplary embodiment 6 |
|---|---|---|---|---|
| Cutoff (nm) | 1037 | 1035 | 1036 | 1023 |
| MFD at 1310 nm (microns) | 8.8 | 8.8 | 8.8 | 8.9 |
| Aeff at 1310 nm (microns$^2$) | 60.0 | 59.8 | 59.9 | 60.0 |
| Dispersion at 1310 nm (ps/nm/km) | −0.30 | −0.51 | −0.58 | −0.05 |
| Slope at 1310 nm (ps/nm$^2$/km) | 0.0900 | 0.0880 | 0.0878 | 0.0930 |
| kappa at 1310 nm (nm) | −3.4 | −5.8 | −6.6 | −0.53 |
| MFD at 1550 nm (microns) | 9.9 | 10.0 | 10.0 | 10.0 |
| Aeff at 1550 nm (microns$^2$) | 75.0 | 75.4 | 75.6 | 75.2 |
| Dispersion at 1550 nm (ps/nm/km) | 17.7 | 16.9 | 16.8 | 18.3 |
| Slope at 1550 nm (ps/nm$^2$/km) | 0.0649 | 0.0620 | 0.0618 | 0.0650 |
| kappa at 1550 nm (nm) | 273.4 | 272.8 | 271.8 | 282.1 |
| Lateral load at 1550 nm (dB) | 0.7 | 0.6 | 0.5 | 0.5 |
| Pin array at 1550 nm (dB) | 29.4 | 26.2 | 23.2 | 23.3 |
| Zero Dispersion Wavelength (nm) | 1313 | 1315 | 1316 | 1310.5 |
| Cable Cutoff (nm) | <1260 | <1260 | <1260 | <1260 |
| Bend loss per turn on a 10 mm mandrel diameter (dB/turn) | 0.1 | 0.19 | 0.12 | 0.04 |
| Bend loss per turn on a 30 mm mandrel diameter (dB/turn) | 0.01 | 0.0015 | 0.0004 | 0.0026 |

TABLE 3

| Parameter | Example 7 |
|---|---|
| R1 (microns) | 5.0 |
| $\Delta 1_{max}$ (%) | 0.46 |
| core alpha | 15 |
| R2 (microns) | 9.6 |
| $\Delta 2$ (%) | 0.00 |
| R1/R2 | 0.52 |
| R3a (microns) | 19.4 |
| $\Delta 3_{min}$ (%) | −0.52 |
| moat alpha (alpha$_t$) | 1 |
| R3 (microns) | 19.4 |
| $\Delta 3a$ (%) | −0.52 |
| (R3a − R2)/(R3 − R2) | 1.00 |
| Moat Volume, $V_{3a3}$ (% Δ microns$^2$) | 82.2 |
| Moat Volume Ratio | 0.56 |
| R4 (microns) | 62.5 |
| $\Delta 4$ (%) | 0.00 |
| $V_4$ (% Δ microns$^2$) | 0 |
| MFD at 1310 nm (microns) | 9.01 |
| MFD at 1550 nm (microns) | 10.16 |
| Dispersion at 1310 nm (ps/nm/km) | −0.94 |
| Slope at 1310 nm (ps/nm$^2$/km) | 0.086 |
| Dispersion at 1550 nm (ps/nm/km) | 15.8 |
| Slope at 1550 nm (ps/nm$^2$/km) | 0.059 |
| Cable Cutoff (nm) | 1254 |
| MACCab (MFD in microns at 1310 nm/CabCutoff in microns) | 7.19 |
| 10 mm diameter Bend (dB/turn) at 1550 nm | 1.23 |
| 15 mm diameter Bend (dB/turn) at 1550 nm | 0.190 |
| 20 mm diameter Bend (dB/turn) at 1550 nm | 0.023 |
| Lambda0 (nm) | 1320 |

TABLE 4

| Parameter | Ex-8 | Ex-9 | Ex-10 | Ex-11 | Ex-12 | Ex-13 | Ex-14 | Ex-15 |
|---|---|---|---|---|---|---|---|---|
| R1 (microns) | 4.88 | 4.64 | 4.56 | 4.40 | 4.88 | 4.56 | 4.40 | 4.56 |
| $\Delta 1_{max}$ (%) | 0.36 | 0.36 | 0.36 | 0.36 | 0.36 | 0.36 | 0.36 | 0.36 |
| core alpha | 5 | 5 | 10 | 10 | 5 | 10 | 15 | 10 |
| R2 (microns) | 10.3 | 9.79 | 9.62 | 9.28 | 11.03 | 10.31 | 9.94 | 10.31 |
| $\Delta 2$ (%) | 0.00 | 0.00 | 0.00 | 0.00 | 0.00 | 0.00 | 0.00 | 0.00 |
| R1/R2 | 0.47 | 0.47 | 0.47 | 0.47 | 0.44 | 0.44 | 0.44 | 0.44 |
| R3a (microns) | 14.64 | 13.92 | 13.68 | 13.20 | 17.08 | 18.24 | 17.60 | 17.10 |
| $\Delta 3_{min}$ (%) | −0.45 | −0.45 | −0.45 | −0.43 | −0.20 | −0.10 | −0.15 | −0.20 |
| moat alpha (alpha$_t$) | 1 | 1 | 1 | 1 | 1 | 1 | 1 | 2 |
| R3 (microns) | 14.64 | 16.29 | 13.68 | 15.44 | 17.08 | 18.24 | 17.6 | 17.1 |
| $\Delta 3a$ (%) | −0.45 | −0.45 | −0.45 | −0.43 | −0.20 | −0.10 | −0.15 | −0.20 |
| (R3a − R2)/(R3 − R2) | 1.00 | 0.64 | 1.00 | 0.64 | 1.00 | 1.00 | 1.00 | 1.00 |
| Moat Volume, $V_{3a3}$ (%Δ microns$^2$) | 26 | 59.2 | 23.0 | 49.7 | 18.5 | 12.5 | 17.5 | 26.4 |
| Moat Volume Ratio | 0.54 | 0.78 | 0.54 | 0.73 | 0.54 | 0.55 | 0.55 | 0.71 |
| R4 (microns) | 62.5 | 62.5 | 62.5 | 62.5 | 62.5 | 62.5 | 62.5 | 62.5 |
| $\Delta 4$ (%) | 0.00 | 0.00 | 0.00 | 0.02 | 0.00 | 0.00 | 0.00 | 0.00 |
| V4 (%Δ microns$^2$) | 0.0 | 0.0 | 0.0 | 13.2 | 0.0 | 0.0 | 0.0 | 0.0 |
| MFD at 1310 nm (microns) | 9.01 | 8.86 | 8.90 | 8.81 | 9.02 | 8.94 | 8.88 | 8.92 |
| MFD at 1550 nm (microns) | 10.12 | 10.07 | 10.01 | 9.93 | 10.25 | 10.12 | 10.04 | 10.07 |
| LP11 Cutoff (nm) | 1256 | 1194 | 1275 | 1167 | 1268 | 1297 | 1287 | 1286 |
| Dispersion at 1310 nm (ps/nm/km) | 0.04 | −0.53 | 0.50 | 0.19 | −0.17 | 0.17 | 0.16 | 0.26 |
| Slope at 1310 nm (ps/nm$^2$/km) | 0.079 | 0.073 | 0.078 | 0.088 | 0.082 | 0.083 | 0.081 | 0.077 |
| Dispersion at 1550 nm (ps/nm/km) | 17.5 | 17.1 | 17.9 | 17.6 | 16.9 | 17.0 | 17.0 | 17.3 |
| Slope at 1550 nm (ps/nm$^2$/km) | 0.062 | 0.063 | 0.061 | 0.062 | 0.061 | 0.059 | 0.089 | 0.060 |
| Cable Cutoff (nm) | 1218 | 1236 | 1232 | 1225 | 1196 | 1203 | 1192 | 1241 |
| MACCab (MFD in microns at 1310 nm/ Cable Cutoff in microns) | 7.40 | 7.17 | 7.22 | 7.19 | 7.54 | 7.43 | 7.45 | 7.19 |
| 10 mm diameter bend loss (dB/turn) | 1.25 | 0.24 | 1.17 | 0.36 | 2.22 | 2.54 | 2.25 | 0.91 |
| 20 mm diameter bend loss (dB/turn) | 0.263 | 0.060 | 0.228 | 0.088 | 0.460 | 0.486 | 0.460 | 0.179 |
| 30 mm diameter bend loss (dB/turn) | 0.005 | 0.003 | 0.003 | 0.004 | 0.006 | 0.005 | 0.006 | 0.003 |
| Lambda0 (nm) | 1309 | 1317 | 1304 | 1308 | 1312 | 1308 | 1318 | 1307 |
| LLWM (dB/m at 1550 nm) | 0.182 | 0.169 | 0.147 | 0.145 | 0.195 | 0.158 | 0.224 | 0.158 |
| Pin Array (dB at 1550 nm) | 6.40 | 7.59 | 4.52 | 10.19 | 7.09 | 4.89 | 9.16 | 4.40 |

TABLE 5

| Parameter | Ex-16 | Ex-17 | Ex-18 | Ex-19 | Ex-20 |
|---|---|---|---|---|---|
| R1 (microns) | 4.56 | 4.56 | 4.33 | 4.46 | 4.25 |
| $\Delta 1_{max}$ (%) | 0.36 | 0.36 | 0.393 | 0.364 | 0.373 |
| core alpha | 10 | 10 | 12 | 12 | 12 |
| R2 (microns) | 10.31 | 13.04 | 6.80 | 7.00 | 7.86 |
| $\Delta 2$ (%) | 0.00 | 0.00 | 0.00 | 0.00 | 0.00 |
| R1/R2 | 0.44 | 0.35 | 0.63 | 0.64 | 0.54 |
| R3a (microns) | 17.10 | 18.24 | 16.8 | 17.3 | 19.4 |
| $\Delta 3_{min}$ (%) | −0.25 | −0.20 | −0.44 | −0.44 | −0.48 |
| moat alpha (alpha$_t$) | 0.5 | 1 | 1 | 1 | 1 |
| R3 (microns) | 17.1 | 18.24 | 16.8 | 17.3 | 19.4 |
| $\Delta 3a$ (%) | −0.25 | −0.20 | −0.44 | −0.44 | −0.48 |
| (R3a − R2)/(R3 − R2) | 1.00 | 1.00 | 1.00 | 1.00 | 1.00 |
| Moat Volume, $V_{3a3}$ (% Δ microns$^2$) | 17.0 | 26.6 | 57 | 60 | 83 |
| Moat Volume Ratio | 0.37 | 0.82 | 0.55 | 0.55 | 0.55 |
| R4 (microns) | 62.5 | 62.5 | 62.5 | 62.5 | 62.5 |
| $\Delta 4$ (%) | 0.00 | 0.00 | 0.00 | 0.00 | 0.00 |
| V4 (% Δ microns$^2$) | 0.0 | 0.0 | 0.0 | 0.0 | 0 |
| MFD at 1310 nm (microns) | 8.93 | 8.93 | 8.57 | 8.88 | 8.59 |
| MFD at 1550 nm (microns) | 10.10 | 10.12 | 9.73 | 10.09 | 9.9 |
| LP11 Cutoff (nm) | 1293 | 1301 | 1163 | 1151 | 1156 |
| Dispersion at 1310 nm (ps/nm/km) | 0.18 | 0.13 | −0.76 | −0.49 | not calculated |
| Slope at 1310 nm (ps/nm2/km) | 0.081 | 0.081 | 0.088 | 0.089 | not calculated |
| Dispersion at 1550 nm (ps/nm/km) | 17.1 | 16.9 | 16.8 | 17.2 | not calculated |
| Slope at 1550 nm (ps/nm2/km) | 0.059 | 0.058 | 0.062 | 0.063 | not calculated |
| Cable Cutoff (nm) | 1215 | 1242 | 1207 | 1205 | 1210 |
| MACCab (MFD in microns at 1310 nm/Cable Cutoff in microns) | 7.35 | 7.19 | 7.10 | 7.37 | 7.10 |
| 10 mm diameter Bend (dB/turn) | 1.82 | 0.89 | 0.26 | 0.35 | 0.07 |
| 20 mm diameter Bend (dB/turn) | 0.352 | 0.18 | 0.060 | 0.10 | 0.02 |
| 30 mm diameter Bend (dB/turn) | 0.004 | 0.003 | 0.002 | 0.003 | 0.002 |

TABLE 5-continued

| Parameter | Ex-16 | Ex-17 | Ex-18 | Ex-19 | Ex-20 |
|---|---|---|---|---|---|
| Lambda0 (nm) | 1308 | 1308 | 1319 | 1316 | 1310 |
| LLWM (dB/m at 1550 nm) | 0.162 | 0.166 | 0.134 | 0.178 | not calculated |
| Pin Array (dB at 1550 nm) | 4.93 | 5.00 | 7.30 | 11.95 | not calculated |

TABLE 6

| Parameter | Ex-21 | Ex-22 | Ex-23 | Ex-24 | Ex-25 | Ex-26 | Ex-27 | Ex-28 |
|---|---|---|---|---|---|---|---|---|
| R1 (microns) | 4.51 | 4.55 | 4.57 | 4.58 | 4.41 | 4.36 | 4.33 | 4.38 |
| $\Delta 1_{max}$ (%) | 0.365 | 0.355 | 0.345 | 0.355 | 0.355 | 0.355 | 0.355 | 0.363 |
| core alpha | 12 | 12 | 12 | 12 | 12 | 12 | 12 | 12 |
| R2 (microns) | 5.95 | 6.02 | 6.09 | 5.78 | 7.67 | 6.14 | 5.6 | 6.09 |
| $\Delta 2$ (%) | 0.00 | 0.00 | 0.00 | 0.00 | 0.00 | 0.00 | 0.00 | 0.00 |
| R1/R2 | 0.76 | 0.76 | 0.75 | 0.79 | 0.57 | 0.71 | 0.77 | 0.72 |
| R3a (microns) | 17 | 17.2 | 17.4 | 16.7 | 17.7 | 17.5 | 17.4 | 16.5 |
| $\Delta 3_{min}$ (%) | −0.435 | −0.435 | −0.435 | −0.433 | −0.481 | −0.466 | −0.466 | −0.55 |
| moat alpha ($alpha_t$) | 1 | 1 | 1 | 1 | 1 | 1 | 1 | 1 |
| R3 (microns) | 17 | 17.2 | 17.4 | 16.7 | 17.7 | 17.5 | 17.4 | 16.5 |
| $\Delta 3a$ (%) | −0.435 | −0.435 | −0.435 | −0.433 | −0.481 | −0.466 | −0.466 | −0.55 |
| (R3a − R2)/(R3 − R2) | 1 | 1 | 1 | 1 | 1 | 1 | 1 | 1 |
| Moat Volume, $V_{3a3}$ (%$\Delta$ microns$^2$) | 64 | 66 | 67 | 62 | 69 | 73 | 76 | 76 |
| Moat Volume Ratio | 0.58 | 0.58 | 0.58 | 0.58 | 0.56 | 0.58 | 0.60 | 0.59 |
| R4 (microns) | 62.5 | 62.5 | 62.5 | 62.5 | 62.5 | 62.5 | 62.5 | 62.5 |
| $\Delta 4$ (%) | 0.00 | 0.00 | 0.00 | 0.00 | 0.00 | 0.00 | 0.00 | 0.00 |
| V4 (%$\Delta$ microns$^2$) | 0 | 0 | 0 | 0 | 0 | 0 | 0 | 0 |
| MFD at 1310 nm (microns) | 8.72 | 8.83 | 8.95 | 8.81 | 9.08 | 8.95 | 8.82 | 8.6 |
| MFD at 1550 nm (microns) | 9.83 | 9.96 | 10.08 | 9.9 | 10.29 | 10.1 | 9.88 | 9.67 |
| LP11 Cutoff (nm) | 1113 | 1110 | 1107 | 1155 | 1120 | 1096 | 1077 | 1077 |
| Dispersion at 1310 nm (ps/nm/km) | −0.712 | −0.623 | −0.534 | −0.356 | −0.801 | −0.445 | −0.089 | −0.72 |
| Slope at 1310 nm (ps/nm2/km) | 0.089 | 0.089 | 0.089 | 0.089 | 0.089 | 0.089 | 0.089 | 0.09 |
| Dispersion at 1550 nm (ps/nm/km) | 17.73 | 17.87 | 18 | 18.1 | 17.65 | 18 | 18.3 | 17.9 |
| Slope at 1550 nm (ps/nm2/km) | 0.063 | 0.063 | 0.063 | 0.063 | 0.063 | 0.063 | 0.063 | 0.063 |
| Cable Cutoff (nm) | 1213 | 1214 | 1216 | 1214 | 1219 | 1217 | 1218 | 1213 |
| MACCab (MFD in microns at 1310 nm/ Cable Cutoff in microns) | 7.19 | 7.27 | 7.36 | 7.26 | 7.45 | 7.35 | 7.24 | 7.09 |
| 10 mm diameter Bend (dB/turn) | 0.206 | 0.223 | 0.245 | 0.271 | 0.234 | 0.196 | 0.167 | 0.1 |
| 20 mm diameter Bend (dB/turn) | 0.057 | 0.065 | 0.074 | 0.077 | 0.072 | 0.062 | 0.054 | 0.03 |
| 30 mm diameter Bend (dB/turn) | 0.002 | 0.0027 | 0.003 | 0.0029 | 0.003 | 0.003 | 0.003 | 0.002 |
| Lambda0 (nm) | 1318 | 1317 | 1316 | 1314 | 1319 | 1315 | 1311 | 1318 |
| LLWM (dB/m at 1550 nm) | 0.138 | 0.152 | 0.17 | 0.143 | 0.209 | 0.17 | 0.138 | 0.121 |
| Pin Array (dB at 1550 nm) | 14.07 | 16.12 | 18.49 | 15.84 | 19.17 | 20.8 | 22.7 | 16.48 |

Also set forth (Tables 4, 5 and 6) are modeled data including: theoretical cutoff (LP11) wavelength in nm, chromatic dispersion and dispersion slope at 1310 nm, chromatic dispersion and dispersion slope at 1550 nm, mode field diameter at 1310 nm and 1550 nm, effective area Aeff at 1550 nm, lateral load wire mesh microbend at 1550 nm, pin array macrobend at 1550 nm, zero dispersion wavelength, 22 m cable cutoff, MACCab, and 1×10, 1×20 and 1×30 mm diameter induced bend losses in dB per turn at 1550 nm. The optical fiber embodiments of Tables 4, 5 and 6 (fiber examples 8-27) have core alpha values between 5 and 15, core radii between about 4 and about 5 microns, and 0.3%<Δ1MAX<0.4%. Most of these fiber embodiments have a bend loss of less than 2 dB/turn (at 1550 nm) when bent around the 10 mm diameter mandrel, less than 0.5 dB/turn (at 1550 nm) when bent around the 20 mm mandrel, and less than 0.01 dB/turn when bent around 30 mm mandrel. The optical fiber embodiments corresponding to Tables 4, 5 and 6 have mode field diameters (MFD) between about 8.5 microns and about 9.1 microns at 1310 nm, and between about 9.6 microns and about 10.3 microns at 1310 nm; Cable Cutoff between 1190 nm and 1250 nm, and MACCab values between 7.1 and 7.6 (MACCab=MFD in microns at 1310 nm/Cable Cutoff in microns).

Figure 2:
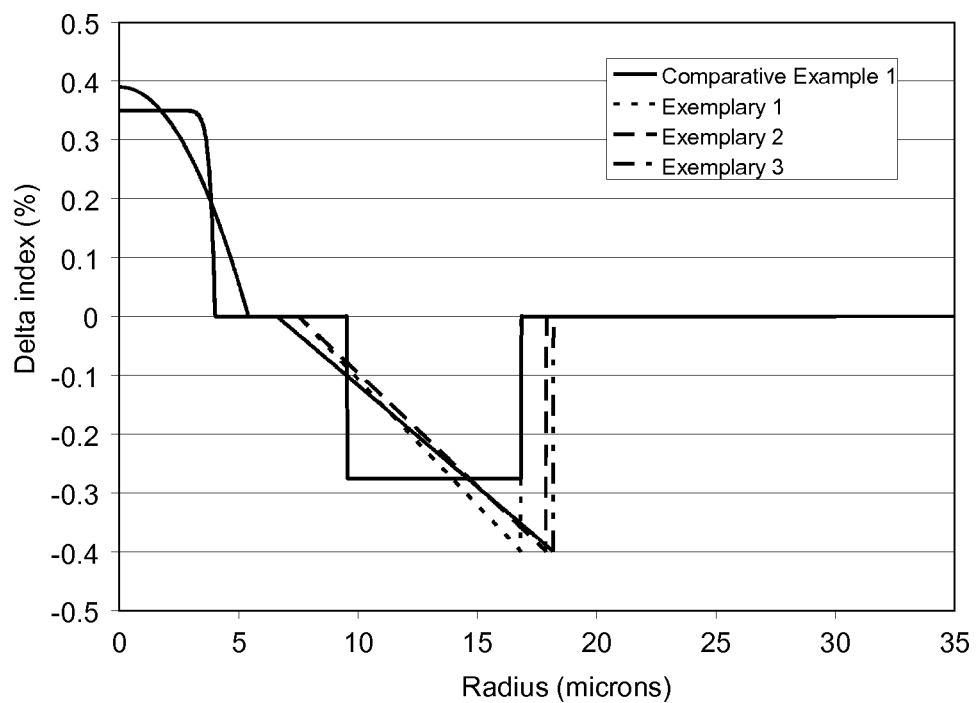
FIG. 2 illustrates relative refractive index profiles corresponding to three embodiments of an optical fiber as disclosed herein, and that of a comparative fiber.

The relative refractive index profiles of a comparative example fiber (rectangular trench) and exemplary fiber embodiments (exemplary fiber embodiments 1, 2 and 3) of Table 1A are illustrated in FIG. 2. More specifically, FIG. 2 illustrates that the exemplary fiber embodiments 1 and 2 have a step like core profile (α=20), and that the exemplary fiber embodiment 3 has a parabolic profile (α=2). Exemplary fiber embodiments 1-3 have trenches having shallower depression in the inner part of the trench and a deeper depression in the outer part of the trench (i.e., the relative refractive index delta is more negative at or near the outer part of the trench). Exemplary embodiment 1 has a radius $r_3$ that is the same as the outer trench radius of the comparative example fiber 1 and smaller trench volume $V_3$. Fiber Example 2 has a radius $r_3$ that is larger than that of Fiber Example 2, but the trench has the larger volume $V_3$ as that of the comparative fiber. Exemplary embodiment 3 has a trench volume the same as that of the exemplary embodiment 2.

Figure 3:
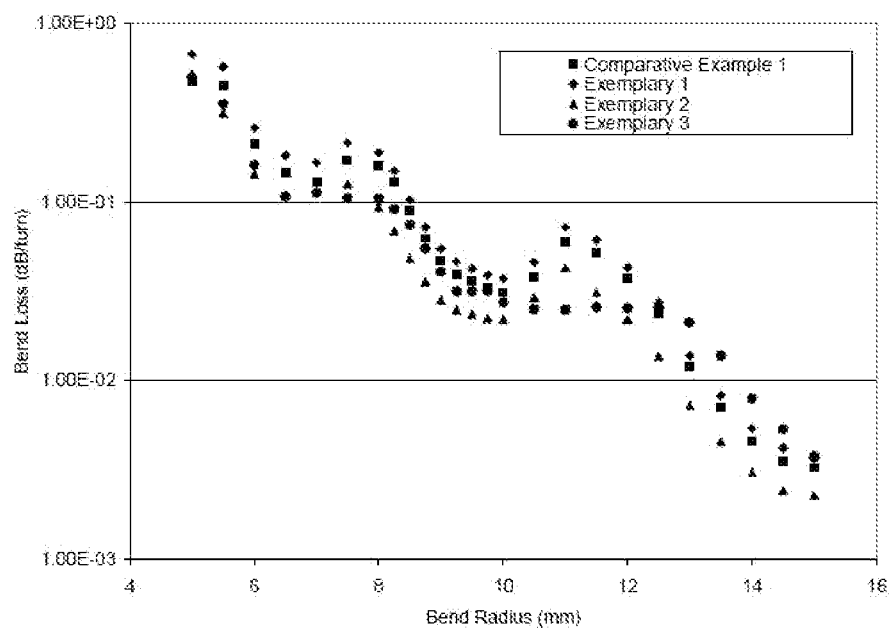
FIG. 3 illustrates bend loss as a function of bend diameters for the optical fibers corresponding to the relative refractive index profiles shown in FIG. 2.

FIG. 3 illustrates the bend loss as a function of bend diameters for Fiber examples 1, 2 and 3 (i.e., for the Exemplary embodiments 1-3) and for the comparative example 1 fiber of Table 1. FIG. 3 illustrates that the fibers with square trench profile and triangular trench profile have similar bend loss at 10 mm bend diameter (5 mm bend radius) but the fiber with a non-rectangular or triangular trench design has similar or better bend loss performance at 30 mm bend diameter (15 mm bend radius).

Figure 4:
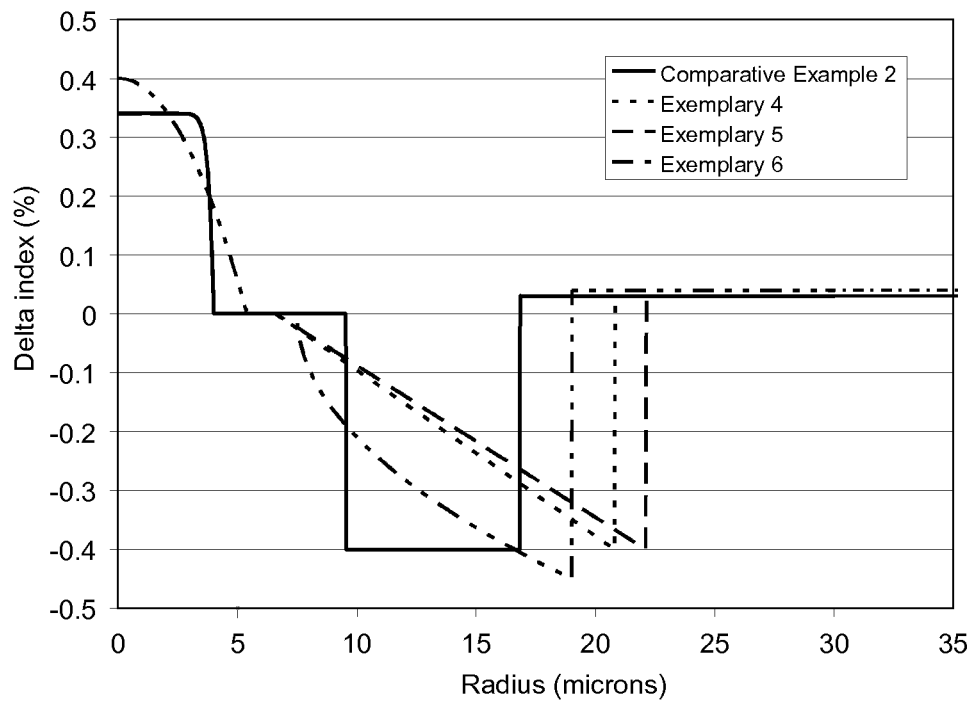
FIG. 4 illustrates relative refractive index profiles corresponding to three embodiments of an optical fiber as disclosed herein, and that of another comparative fiber.

The relative refractive index profiles of another comparative example fiber 2 (rectangular trench) and three fiber embodiments (Fiber Examples 4, 5 and 6) of Table 1 are illustrated in FIG. 4. The fibers in FIG. 4 have an updoped outer cladding region 4. More specifically, FIG. 4 illustrates that Fiber Examples 4 and 5 have a step like core profile (α=20), and Fiber Example 6 has a parabolic profile (α=2). Fiber Examples 4-6 have triangular trenches having shallower depression in the inner part of the trench and a deeper depression in the outer part of the trench. Fiber Example 4 has a radius $r_3$ that is larger than the outer trench radius of the comparative example fiber. Fiber Example 5 has a radius $r_3$ that is larger than that of Fiber Example 4. Fiber Example 6 has a trench shape that is different than Fiber Example 5, but the trench volume is similar for Examples 5 and 6. The shape of the trench region 3 and the updoping of outer cladding region (with respect to first inner cladding region 2) also helps in having larger trench volume $V_3$ (~105% micron) and simultaneously have cable cutoff less than 1260 nm.

Figure 5:
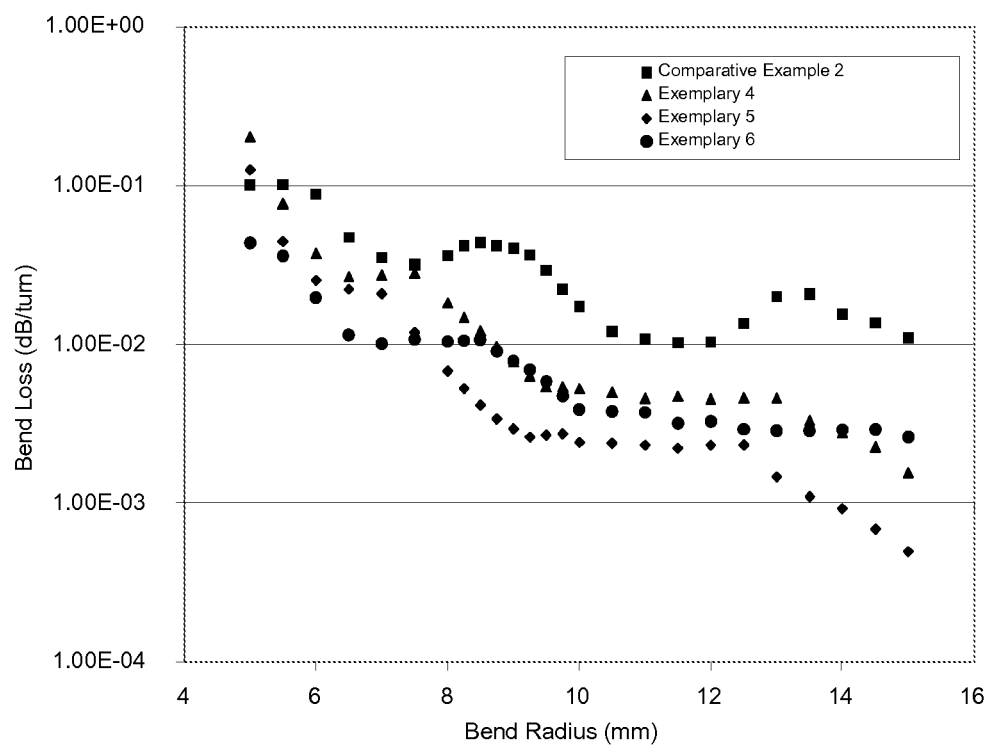
FIG. 5 illustrates bend loss as a function of bend diameters for the optical fibers corresponding to the relative refractive index profiles shown in FIG. 4.

FIG. 5 illustrates the Bend loss as a function of bend diameters for Fiber Examples 4, 5 and 6 of Table 1B and for the second comparative example fiber. Applicants discovered that the fiber with square moat and triangular moat have similar bend loss at 10 mm bend diameter (5 mm bend radius) but the triangular trench fiber design has much better bend loss performance at 30 mm bend diameter (15 mm bend radius). If the trench volume is increased, fiber performance improves even further.

Figure 6:
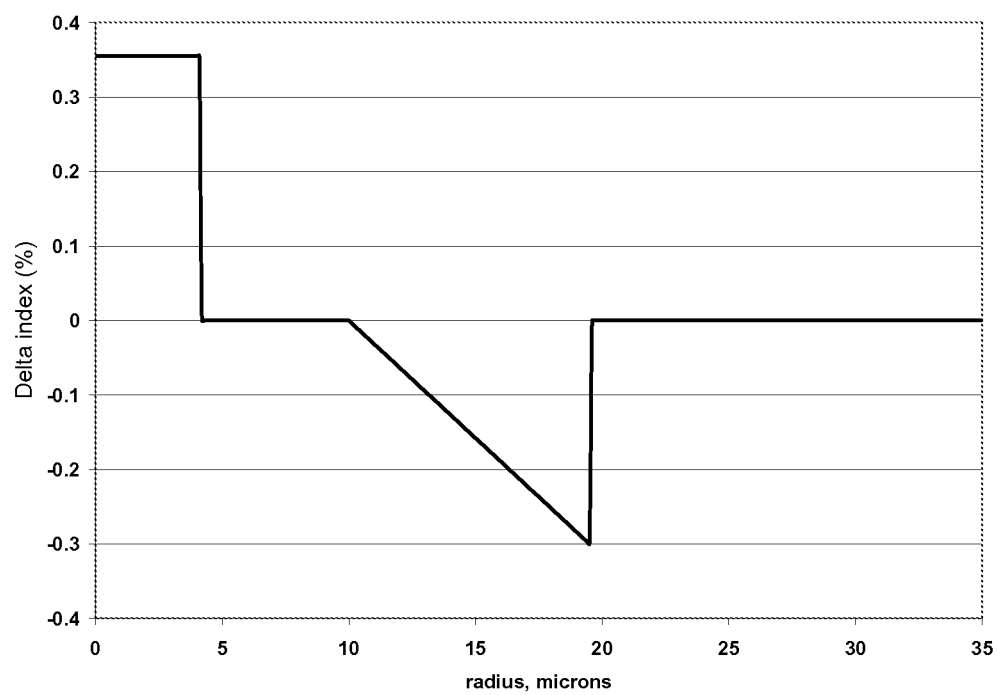
FIG. 6 illustrates relative refractive index profile of a modeled fiber embodiment.

The relative refractive index profiles for another modeled fiber corresponding to this profile are illustrated in FIG. 6. The measured optical properties of the manufactured fiber Example 7 are shown in Table 3, demonstrating good bend performance and other properties compatible with G.657 and G.652 specifications.

Preferably, exemplary optical fiber embodiments 10 exhibit a bend loss at 1550 nm, when wound upon on a 20 mm diameter mandrel, of less than 0.5 dB/turn, and in some cases less than 0.25 dB/turn. These fibers also exhibit a bend loss at 1550 nm, when wound upon on a 10 mm diameter mandrel, of less than 2 dB/turn, more preferably less than 1 dB/turn, more preferably less than 0.5 dB/turn, and some fibers most preferably less than 0.2 dB/turn. These fibers also exhibit a bend loss at 1550 nm, when wound upon on a 30 mm diameter mandrel, of less than 0.01 dB/turn, and some fibers more preferably less than 0.003 dB/turn. Some of these examples employ chlorine in the outer cladding region in an amount greater than 2000 ppm, and in some cases greater than 3 000 or even greater than 4000 ppm by weight. In some embodiments the outer cladding region comprises chlorine in an amount greater than 2000 and less than 12000 ppm by weight.

Some exemplary optical fiber embodiments 10 exhibit a bend loss at 1550 nm, when wound upon on a 15 mm diameter mandrel, of less than 0.5 dB/turn, and in some cases less than 0.25 dB/turn. At least some of these e fibers also exhibit a bend loss at 1550 nm, when wound upon on a 10 mm diameter mandrel, of less than 1 dB/turn, more preferably less than 0.5 dB/turn, and some fibers most preferably less than 0.2 dB/turn. The fibers exhibit a bend loss at 1550 nm, when wound upon on a 15 mm diameter mandrel, of less than 0.25 dB/turn, and some fibers more preferably less than 0.15 dB/turn. The fibers exhibit a bend loss at 1550 nm, when wound upon on a 20 mm diameter mandrel, of less than 0.1 dB/turn, and some fibers more preferably less than 0.03 dB/turn.

Attenuation (spectral) at 1550 nm is preferably less than 0.21 dB/km, more preferably less than 0.20 dB/km, even more preferably less than 0.197 dB/km. In some preferred embodiments the attenuation (spectral) at 1550 nm is less than or equal to 0.191 dB/km, even more preferably less than or equal to 0.189 dB/km, even more preferably less than or equal to 0.182 dB/km.

Thus, the embodiments of the optical fibers 10 described herein provide outstanding bending performance, and additionally provide cutoff wavelengths suitable for single mode operation at wavelengths greater than about 1260 nm.

In some embodiments, the core may comprise a relative refractive index profile having a so-called centerline dip which may occur as a result of one or more optical fiber manufacturing techniques. However, the centerline dip in any of the relative refractive index profiles disclosed herein is optional.

The optical fiber disclosed herein comprises a core and a cladding layer (or cladding or outermost annular cladding region) surrounding and directly adjacent the core. Preferably, the core is comprised of silica doped with germanium, i.e. germania doped silica. Dopants other than germanium, singly or in combination, may be employed within the core, and particularly at or near the centerline, of the optical fiber disclosed herein to obtain the desired refractive index and density. In preferred embodiments, the core of the optical fiber disclosed herein has a non-negative relative refractive index profile, more preferably a positive relative refractive index profile, wherein the core is surrounded by and directly adjacent to a cladding layer.

Preferably, the optical fiber disclosed herein has a silica-based core and cladding. In preferred embodiments, the cladding has an outer diameter, 2 times $r_4$, of about 125 micron.

The fibers disclosed herein exhibit low PMD values particularly when fabricated with OVD processes. Spinning of the optical fiber may also lower PMD values for the fiber disclosed herein.

It is to be understood that the foregoing description is exemplary only and is intended to provide an overview for the understanding of the nature and character of the fibers which are defined by the claims. The accompanying drawings are included to provide a further understanding of the preferred embodiments and are incorporated in and constitute part of this specification. The drawings illustrate various features and embodiments which, together with their description, serve to explain the principals and operation. It will become apparent to those skilled in the art that various modifications to the preferred embodiments as described herein can be made without departing from the spirit or scope of the appended claims.

What is claimed is:

1. A single mode optical fiber comprising:
a central core region having outer radius $r_1$ and relative refractive index $\Delta_1$;
a cladding region comprising (i) a first inner cladding region situated directly adjacent to said central core region and having an outer radius $r_2 > 6$ microns and relative refractive index $\Delta_2$ and $0.3 \leq r_1/r_2 \leq 0.85$; (ii) and a second inner cladding region situated directly adjacent to said first inner cladding region and having an outer radius $r_3 > 9$ microns and comprising a minimum relative refractive index $\Delta_3$, wherein said second inner cladding region has at least one region with a relative refractive index delta that becomes more negative with increasing radius such that $1.5 \geq \beta \geq 0.5$, where $$\beta = \frac{(R_3 - R_2)}{\Delta_{3,min}} \left(\frac{d\Delta}{dr}\right)_{average},$$

and where $$\left(\frac{d\Delta}{dr}\right)_{average}$$

is the average index slope in the second inner cladding region; and (iii) an outer cladding region surrounding the second inner cladding region and comprising relative refractive index $\Delta_4$, wherein $\Delta_1 > \Delta_2 > \Delta_3$, $\Delta_3 < \Delta_4$.

2. The single mode optical fiber of claim 1 wherein $0.15 \leq (\Delta_4 - \Delta_3) \leq 0.7$ and the absolute difference between $\Delta_3$ and $\Delta_2$ is greater than 0.03, the absolute value $V_3$ of the second inner cladding region is 35% $\Delta\mu m^2 \leq V_3 \leq 105\%$ $\Delta\mu m^2$, said fiber exhibits a 22 m cable cutoff less than or equal to 1260 nm, and has a zero dispersion wavelength $\lambda_o$ and 1300 nm $\leq \lambda_o \leq 1324$ nm.

3. The single mode optical fiber of claim 2 wherein $0.20 \leq (\Delta_4 - \Delta_3) \leq 0.7$.

4. The single mode optical fiber of claim 2 wherein $0.25 \leq (\Delta_4 - \Delta_3) \leq 0.7$.

5. The single mode optical fiber of claim 1, wherein the first inner cladding region is free of fluorine and germania.

6. The single mode optical fiber of claim 1, wherein $\Delta_4 > \Delta_2$ for a length extending from $r_3$ to a radius of at least 30 microns.

7. The single mode optical fiber of claim 1, wherein $0.33 \leq r_1/r_2$.

8. The single mode optical fiber of claim 1, wherein the profile volume, $V_4$ of the outer cladding region, calculated between the outer radius of the second inner cladding region and a radial distance of 30 um, is equal to:

$$V_4 = 2 \int_{r3}^{r30} \Delta_{(4-3)}(r) r \, dr$$

and $|V_4|$ is at least 5% $\Delta\mu m^2$.

9. The single mode optical fiber of claim 1, wherein said fiber exhibits a bend loss of less than 0.75 dB/turn when wound upon on a 20 mm diameter mandrel, and exhibits a MAC number (MFD in microns at 1310 nm/Cable Cutoff in microns) between 6.6 and 7.5.

10. The single mode optical fiber of claim 9, wherein said fiber exhibits a bend loss of less than 0.01 dB/turn when wound upon on a 15 mm radius mandrel.

11. The single mode optical fiber of claim 1, wherein the width of second inner cladding region $r_3 - r_2$ is between 3 and 20 microns.

12. The single mode optical fiber of claim 1, wherein the second inner cladding region contains less than 0.02 wt % fluorine.

13. The single mode optical fiber of claim 1, wherein said central core region comprises germania doped silica.

14. The single mode optical fiber of claim 1, wherein $\Delta_3 < -0.35$.

15. The single mode optical fiber of claim 14, wherein $1.1 \geq \beta \geq 0.5$.

16. The single mode optical fiber of claim 14, wherein $1.1 \geq \beta \geq 0.75$.

17. The single mode optical fiber of claim 1, wherein $50 \geq \alpha_t$, where $\alpha_t$ is the trench alpha parameter.

18. The single mode optical fiber of claim 17, wherein $5 \geq \alpha_t \geq 0.5$.

19. The single mode optical fiber of claim 1, where said central core region has an alpha profile, alpha$_{core}$, of $2 < $alpha$_{core} \leq 100$.

20. The single mode optical fiber of claim 19, where said central core region has an alpha profile, alpha$_{core}$, of $2 \leq $alpha$_{core} \leq 20$.

21. A single mode optical fiber comprising:
a central core region having outer radius $r_1$ and relative refractive index $\Delta_1$;
a cladding region comprising (i) a first inner cladding region having an outer radius $r_2 > 6$ microns and relative refractive index $\Delta_2$ and $0.3 \leq r_1/r_2 \leq 0.85$; (ii) and a second inner cladding region having an outer radius $r_3 > 9$ microns and comprising a minimum relative refractive index $\Delta_3$, wherein said second inner cladding region has at least one region with a relative refractive index delta that becomes more negative with increasing radius; and (iii) an outer cladding region surrounding the second inner cladding region and comprising relative refractive index $\Delta_4$, wherein $\Delta_1 > \Delta_2 > \Delta_3$, $\Delta_3 < \Delta_4$, the absolute difference between $\Delta_3$ and $\Delta_2$ is greater than 0.03, the absolute value $V_3$ of the second inner cladding region is 35% $\Delta\mu m^2 \leq V_3 \leq 105\% \Delta\mu m^2$, said fiber exhibits a 22 m cable cutoff less than or equal to 1260 nm, and has a zero dispersion wavelength $\lambda o$ and 1300 nm $\leq \lambda o \leq$ 1324 nm and wherein $0.35 < (\Delta_4 - \Delta_3) \leq 0.7$.

* * * * *